Nov. 25, 1969 W. K. LARKIN 3,480,289
SURFACE VEHICLE

Filed March 6, 1968 2 Sheets-Sheet 1

INVENTOR.
WALLACE K. LARKIN
BY
*a. C. Smith*
ATTORNEY

INVENTOR.
WALLACE K. LARKIN

BY  *Q. C. Smith*

ATTORNEY

United States Patent Office 3,480,289
Patented Nov. 25, 1969

3,480,289
SURFACE VEHICLE
Wallace K. Larkin, 74 Hollins Drive,
Santa Cruz, Calif. 95060
Filed Mar. 6, 1968, Ser. No. 715,468
Int. Cl. B62b 19/00
U.S. Cl. 280—21                                         10 Claims

ABSTRACT OF THE DISCLOSURE

A surface vehicle includes a rearwardly-disposed pair of supporting skis which are canted about longitudinal axes in response to transverse or yawing motion of the vehicle relative to the intended direction of travel. The skis are canted by the movement relative to the vehicle of a free-trailing, rudder-like direction sensor which thus automatically provides stabilization against yawing or sideways skidding. Highly efficient braking of the forward motion of the vehicle may be accomplished by maneuvering the vehicle into a sideways skid to cant the skis against the direction of motion in the same manner as an experienced skier executes a parallel turn.

BACKGROUND OF THE INVENTION

Ski-supported vehicles have not proven to be practical on any surfaces other than ice or smooth, hard snow because of the inherent instability of skis which are conventionally attached to the vehicle. As such a vehicle maneuvers through a turn, the ski on the outside of the turn tends to support a greater portion of the vehicle weight due to the initial momentum of the vehicle and to centrifugal force acting on the vehicle at a center of gravity above the skis. These effects tend to cause the fixed ski on the outside of the turn to depress deeper into the supporting surface medium than the ski on the inside of the turn, thereby setting up an unstable nagative dihedral angle in the skis. This causes the skis to dig in deeper as sideways motion continues, thereby rapidly regenerating the sideways drag of the skis below the center of gravity of the vehicle causing the vehicle to upset on the slightest turn. This effect is particularly troublesome in a ski-supported snow vehicle endeavoring to traverse the fall line of a slope. As such a vehicle undergoes side-slipping motion, the supporting ski on the downhill side tends to bear a greater portion of the weight, thus causing that ski to settle further into the snow setting up a regenerative action that produces instability and upset. This inherent instability of conventionally-mounted skis has precluded the use of ski-supported vehicles on other surfaces such as water, wet grass, soft snow, and the like, where skis are by far the most compatible, efficient and desirable means of support for a vehicle.

SUMMARY OF THE INVENTION

Accordingly, the vehicle support apparatus of the present invention includes a pair of support skies which are pivotable about longitudinal axes to permit rolling motion or canting of the skis. The canting of the skis about their longitudinal axes is controlled by a free-trailing sensor which is mounted on the vehicle to rotate about a vertical axis and which drags along in the supporting medium for movement with respect to the vehicle independent of the steering control apparatus of the vehicle. Thus any yawing or side-skidding motion of the vehicle relative to the sensor, whether or not initiated by the driver, establishes a positive dihedral angle or canting of the ski which stabilizes against further yawing or sideskidding motion.

DESCRIPTION OF THE PREFERRED EMBODIMENT

Figure 1:
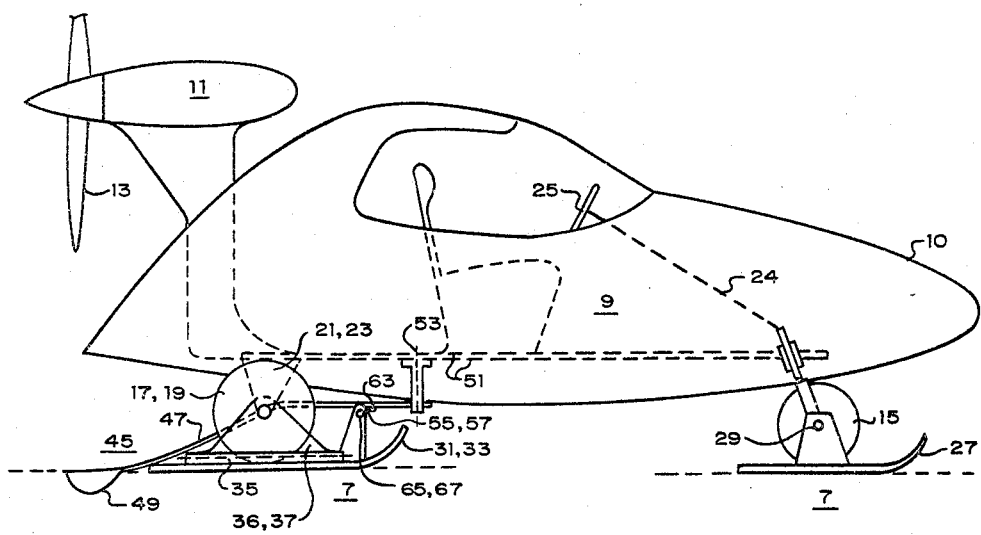
FIGURE 1 is a side view of a propeller-driven vehicle equipped with skis and cant-control apparatus according to the present invention.
Figure 2:
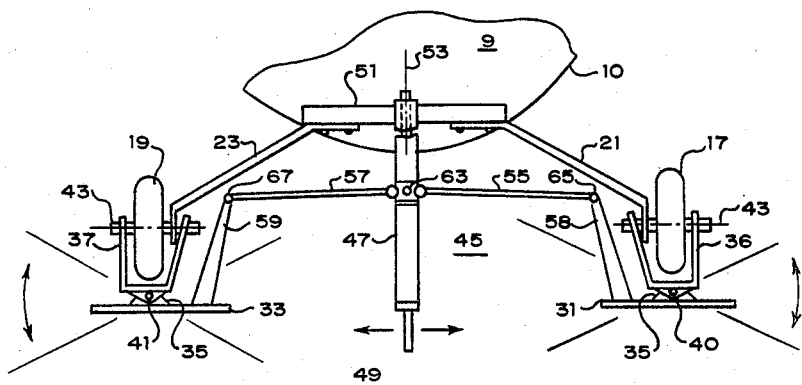
FIGURES 2 and 3 are rear and simplified top views, respectively, of the cant-control apparatus of FIGURE 1.

Referring now to FIGURE 1, there is shown a vehicle 9 which may be propelled by a rear-mounted engine 11 and propeller 13. Of course, the vehicle may not include a source of power where it is to be towed or used in free-sliding operation. The vehicle 9 may have a buoyant, water-tight body 10 for operation in water and may include at least three conventional wheels, preferably one steerable wheel 15 forward and two laterally-spaced wheels 17, 19 mounted aft on resillient lateral struts 21, 23 for operation on hard surfaces such as roadways, sand, and the like. The steerable forward wheel 15 is mounted to rotate about an axis which is slanted forward in order to provide canting of the wheel against a turn. This wheel is mechanically coupled through suitable linkage 24 to a steering wheel 25, or the like, for manual control of the direction of travel of the vehicle.

For operation of the vehicle on water, snow, ice, wet grass, mud, or the like, skis may be substituted for the wheels 15, 17, 19 as the surface-engaging elements. Thus, a single ski 27 may be pivotally mounted about the axle 29 of the forward wheel 15 and a pair of skis 31, 33 may be mounted on the axis of the rear wheels 17 and 19. These rear skis 31 and 33 each include a support block 35 which mates with a yoke-shaped mount 36, 37 to form a longitudinally hinged support that is tiltable or cantable about the longitudinal axes 38, 39 of hinge pin 40 and 41. The yoke-shaped mounts 36, 37 are pivotally mounted about the axles of wheels 17, 19 for pivotal motion about the transverse axis 43 of the wheels 17, 19. Thus, each of the rear skis 31, 33 may rotate about the transverse axis in response to the surface 7 over which the ski travels and about the longitudinal axis in response to the motion of the direction sensor 45 with respect to the vehicle 9.

This direction sensor 45 includes a resilient arm 47 having a rudder-like fin 49 depending from the rearmost end of the arm 47. The forward end of the arm is pivotally mounted to the longitudinal support beam 51 for rotation about a substantially vertical axis 53. The connecting rods 55, 57 which are pivotally connected to the cant-control arms 58, 59 that are rigidly attached to the skis 31, 33, respectively, couple the generally horizontal movement of a point 63 on the arm 47 intermediate the axis 53 an the fin 49 to the skis 31, 33 for altering their cant angles about the longitudinal axes 38 and 39. The cant-control arms 58 and 59 may be rigidly attached as by welding, riveting, or the like, to the skis 31 and 33 near the inside edges thereof tilted toward the arm 47. The equivalent moment arm for canting each of the skis 31, 33 about its longitudinal axis 38, 39 in response to horizontal movement of connecting rods 55, 57 is effectively the height above the longitudinal axis 38, 39 to the pivotal coupling 65, 67 with the connecting rods 55, 57. It can be seen therefore that a given movement of the connecting rods 55, 57 tilts the skis 31, 33 on the axes 38, 39 in the same direction of rotation but through different rotational angles due to the equivalent shortening and lengthening of the moment arms of the two skis 31, 33 about their longitudinal axes 38, 39. This has the effect of producing a desirably greater canting of the ski on the side of the vehicle that is advancing into sideways slipping or yawing motion.

In operation, the vehicle 9 may move over the surface of the supporting medium 7 such as water or snow under its own power or, optionally while being towed or while free-sliding on a downhill run. While traveling in a straight line, the skis 27, 31, 33 are generally transversely and longitudinally parallel to or coplanar with the surface of the supporting medium 7. The rudder-like fin 49 penetrates the surface of the medium 7 and trails along in the line of travel over obstacles, waves, rough surfaces, and the like. The arm 49 resiliently urges the fin 49 to penetrate the supporting medium 7 to a depth which increases as the density of the medium decreases. This insures continuous control of the canting of skis 31, 33 substantially independently of surface conditions.

Figure 3:
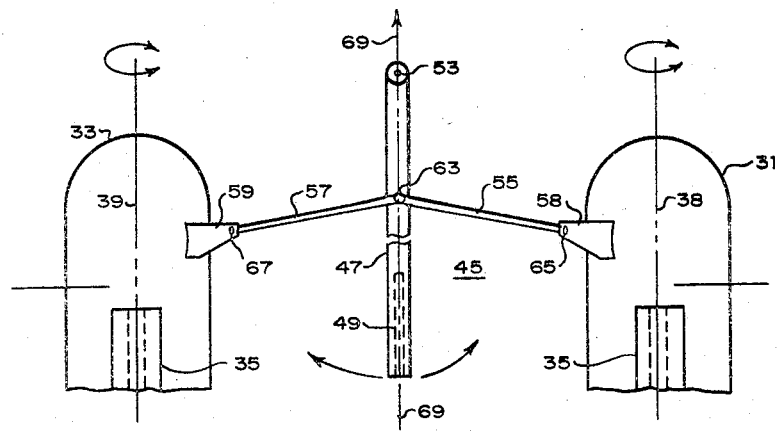

To execute a controlled turn, the steering wheel 25 is operated in the selected direction to twist the forward ski 27 about its tilted rotational axis. This cants the forward ski 27 through a slight angle sufficient to urge the underside surface of the ski 27 against the sideways thrust of a turn. The sharper the turn, the greater the canting of the forward ski 27 against the lateral thrust encountered in a turn. More importantly, however, the direction sensor 45, operating independently of the steering wheel 25 and associated linkage 24, rotates about its axis 53 as the vehicle changes course or direction. Thus, considering FIGURE 3, if the vehicle maneuvers to the right, the fin 49 which is trailing along in the medium also moves to the right of the centerline 69 of the vehicle 9. This movement of the arm 47 causes the left-side edges of the skis 31, 33 to elevate (moreso on the left-side ski 33 than on the right-side ski 31) to cant the skis against the tendency of the back end "breaking loose" to the left while executing a right turn. Similarly, when maneuvering through a left turn, the fin 49 and arm 47 move to the left of the centerline 69 and cause the right-side edges of the skis 31, 33 to elevate (moreso on the right-side ski 31 than on the left-side ski 33). This canting movement of skis 31, 33 about the axes 38, 39 increases as the turn gets sharper or as the back end yaws or skids out of the line of travel so that continuous, instantly corrective action against skidding is automatically provided in the correct amount to maintain a high degree of lateral stability, independently of the manually-controlled forward ski 27. The arm 45 may be restricted to rotation about its axis 53 within a limited angle left and right of center. The fin 49 thus also provides some resistance against lateral motion when the arm 45 is against a limit, thus aiding in stopping the lateral motion of the vehicle.

It should be noted that this ski-canting action is instantly and automatically provided as the vehicle 9 tends to go into a skid or begins to sideslip while traversing the fall line of a slope. More importantly, it should be noted that this ski-canting action cannot properly be mechanically tied to the steering wheel 25 and mechanical linkage 24. This is because a linkage arrangement which provided proper canting of the skis 31, 33 for controlled turns would contribute to the lateral instability of the vehicle 9 undergoing an undesirable sideslip or skid by negatively canting the sidewise leading ski, thereby causing it to dig in sidewise, in response to a driver's normal reaction of steering in the direction of the skid. From this then, it should be noted that the canting movement of the skis 31, 33 is provided only in response to the direction of travel of the vehicle and is not directly affected by the manual control of the forward ski 27. Because of this feature of the present invention, the vehicle 9 may be rapidly and safely braked to a complete stop by manually steering the vehicle into a sharp turn in one direction to cause the back end to "break away" into a skid in the other direction. Accomplishing this, the driver need only cut the propelling power and correct the steering to maintain the vehicle in the attitude of a sideways slide with the vehicle 9 oriented broadside to the original line of direction. The vehicle rapidly slides to a complete stop substantially in the same manner as an experienced skier may stop by executing a parallel turn. Of course, where desirable, a similar pair of skis may be provided to support the front end of a vehicle. There, the forward pair of skis is mounted to rotate about a common or central steering axis or each of the skis may be mounted to rotate about separate steering axes in response to manual control of the steering wheel. The canting control, however, may be automatically provided by a separate direction sensor similar to the sensor 45 described above.

Figure 4A:
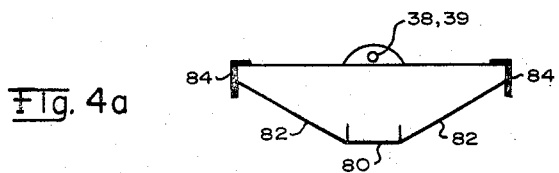
FIGURES 4(a) and (b) are cross-sectional views of of the preferred embodiment of the skis of FIGURE 1.

The force required to cant the skis against lateral motion may be reduced and, at the same time, the load-supporting and sliding efficiency of the skis while operating on dense media such as hard snow or ice may be increased by shaping the underside of the skis as shown in FIGURE 4(a) and (b). The flat central support surface 80 provides the main contact area during straight line operation of the vehicle 9. However, as the cant-control apparatus of the present invention alters the cant angle of the skis about the longitudinal axes 38, 39, the skis shown in FIGURE 4(a) then ride on the slanted side surfaces 82 and present greater surface area against the direction of advancing lateral motion for increased lateral braking force. The resistance to lateral motion may be further increased by providing side keels 84 which protrude below the slanted side surfaces 82 to provide "digging in" action against lateral motion.

Figure 4B:
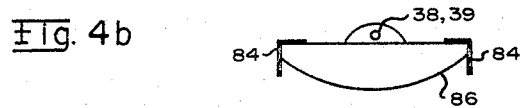

The ski design shown in FIGURE 4(b) includes an arcuate surface 86 for providing a smooth transition from operation on the lower-most portion of the ski to operation on side portions of surface as the ski cants against lateral motion. Side keels 84 may also be provided to enhance the resistance of the canted ski to advancing lateral motion.

Therefore, the present invention automatically provides lateral stabilizing forces for a surface vehicle in response to changes in the direction of travel by canting the vehicle-supporting skis in the direction of sideslipping or yawing motion. The high load-supporting efficiency of skis and their adaptability to many types of surfaces thus enables the present vehicle to travel over many different types of supporting media with a high degree of lateral stability and directional control.

I claim:
1. A surface vehicle comprising:
   a plurality of surface-engaging support members for the vehicle mounted near the forward and rearward ends of the vehicle, at least one of said support members being rotatable about a pivot axis substantially parallel to the longitudinal axis of the vehicle;
   direction-sensor means mounted on the vehicle to engage the surface of a supporting medium on which the vehicle moves and to undergo transverse movement with respect to the longitudinal axis of the vehicle in response to motion of the vehicle in a direction which includes a lateral component; and
   coupling means coupling the transverse movement of the direction-sensor means to the rotatable one of said support members for rotating the same about its pivot axis.
2. A surface vehicle as in claim 1 comprising a pair of transversely-spaced surface-engaging support members for the vehicle disposed near the rearward end thereof and rotatably mounted about pivot axes which are substantially parallel to the longitudinal axis of the vehicle;
   at least one surface-engaging support member disposed near the forward end of said vehicle pivotally mounted to rotate about an axis which is oriented in a direction that includes a vertical component; and
   means coupled to said one support member disposed near the forward end of said vehicle for manually controlling the angular position of said one support member about its pivot axis.

3. A surface vehicle as in claim 1 wherein:
said surface-engaging support members are skies.

4. A surface vehicle as in claim 1 wherein:
said surface-engaging support members are wheels; and
at least one ski is selectively attachable to each of said wheels.

5. A surface vehicle as in claim 2 wherein:
the support members are skis and said one support member disposed near the forward end of said vehicle is manually rotatable about an axis which is within a substantially vertical plane aligned with the longitudinal axis of said vehicle and which is tilted forward to provide positive cant angle of the forward ski against lateral component of motion of the vehicle, said positive cant angle increasing as the angular position of the forward ski relative to the longitudinal axis of the vehicle increases; and
said direction-sensor means is rotatable about its pivot axis independent of direct mechanical coupling to the manually rotatable forward ski.

6. A surface vehicle as in claim 3 wherein:
said direction-sensor means includes an arm mounted on said vehicle near the forward end of said arm for rotation about a substantially vertical axis and includes a fin which depends from said arm near the rearward end thereof for engaging the surface of a supporting medium on which said vehicle moves; and
said coupling means includes connecting rods pivotally attached to said arm at a location thereon intermediate the ends thereof and to each of said pair of skis for positively canting the skis against the lateral component of movement of the vehicle in response to rotational motion of said arm about its pivot axis.

7. A surface vehicle as in claim 5 wherein:
at least said transversely-spaced pair of skis disposed near the rear end of said vehicle include underside surfaces which include surface portions of longitudinal extent that are laterally disposed at acute angles with respect to a substantially horizontal plane.

8. A surface vehicle as in claim 6 wherein:
each of said pair of skis is attached to a lateral support arm of said vehicle for rotation about an axis which is substantially parallel to the longitudinal axis of said vehicle and which is disposed substantially in the center of the width of said skis;
a cant-control lever attached to each of said pair of skis and lying within a plane which includes a vertical component; and
said connecting rods pivotally attached to said arm are pivotally attached to said cant-control levers for rotating said skis about their pivot axes to positively canting said skis against lateral component of motion of said vehicle.

9. A surface vehicle as in claim 6 wherein:
said coupling means includes apparatus for positively canting the one of said pair of skis on the side of said vehicle which advances in the direction of a lateral component of motion of the vehicle by a greater cant angle than the other of said pair of skis.

10. Any and all features and/or combination of features shown and/or described herein.

References Cited

UNITED STATES PATENTS

| | | | |
|---|---|---|---|
| 1,888,857 | 11/1932 | Greene | 280—21.1 |
| 2,317,048 | 4/1943 | Fosbak | 280—21.1 |
| 2,905,479 | 9/1959 | Schomers | 280—21.1 |

LEO FRIAGLIA, Primary Examiner

JOEL E. SIEGEL, Assistant Examiner

U.S. Cl. X.R.

180—3